No. 699,444. Patented May 6, 1902.
S. J. BRIGHTON.
DEVICE FOR PREVENTING SWINE FROM ROOTING, &c.
(Application filed Apr. 20, 1900.)
(No Model.) 2 Sheets—Sheet 1.
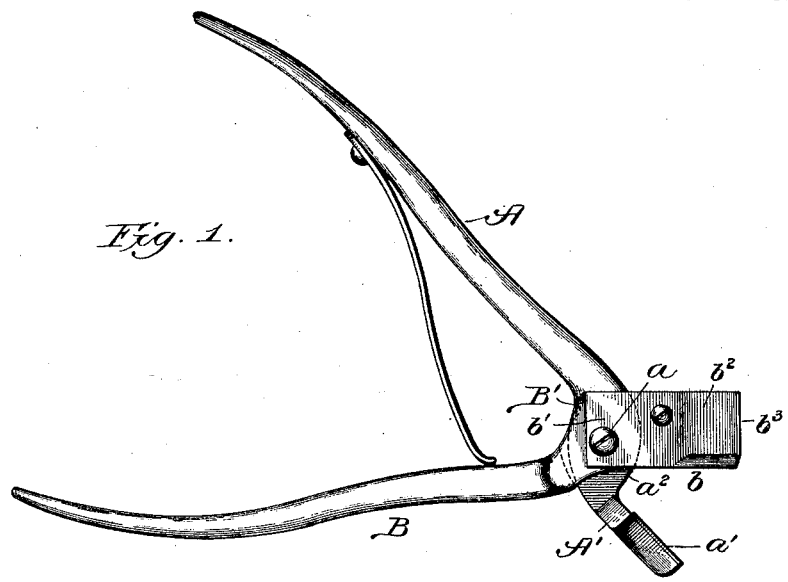
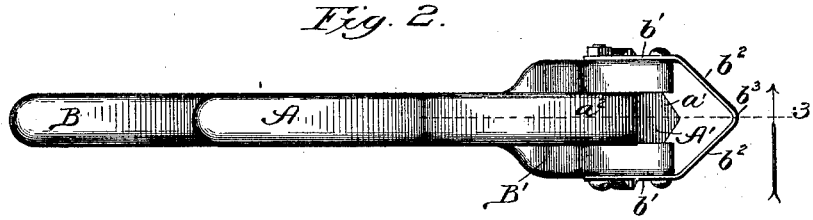
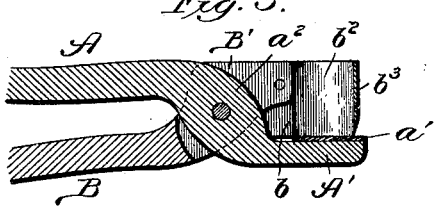
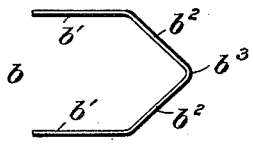
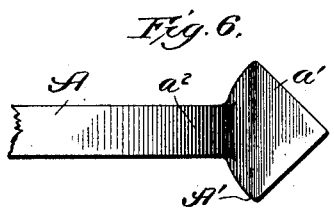
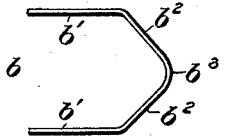
Witnesses:
Albert D. Bacci.
John Enders Jr.
Inventor
Samuel J. Brighton,
By Dyrenforth, Dyrenforth & Lee,
Att'ys.

No. 699,444. Patented May 6, 1902.
S. J. BRIGHTON.
DEVICE FOR PREVENTING SWINE FROM ROOTING, &c.
(Application filed Apr. 20, 1900.)
(No Model.) 2 Sheets—Sheet 2.
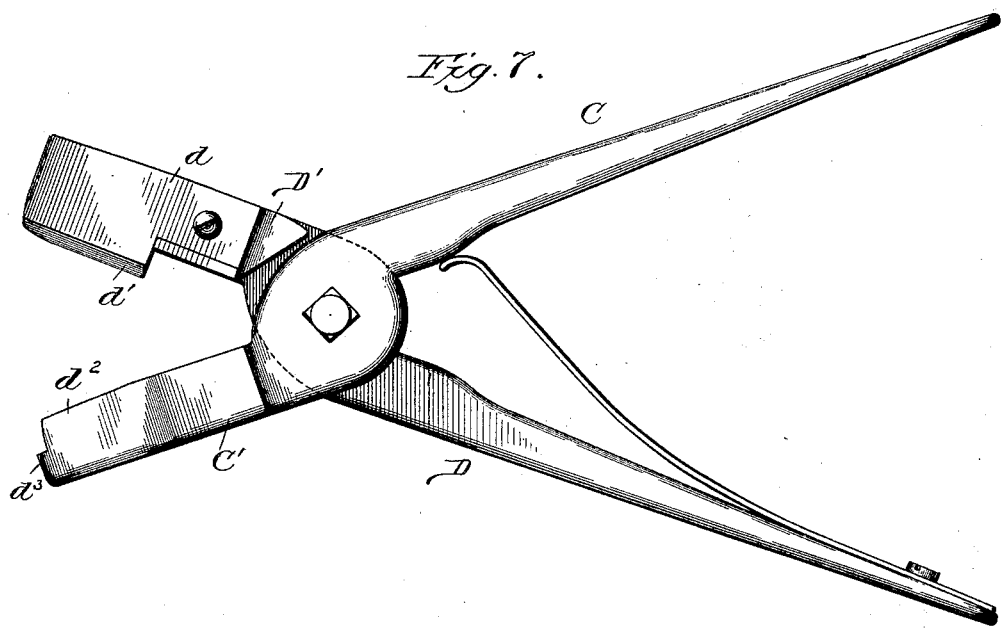
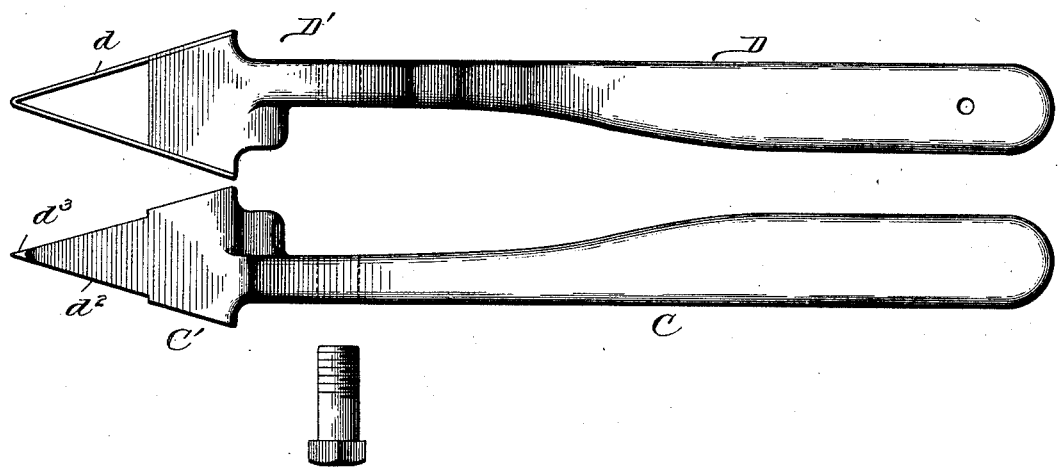
Witnesses:
Inventor
Samuel J. Brighton,

UNITED STATES PATENT OFFICE.

SAMUEL J. BRIGHTON, OF FAIRFIELD, IOWA.

DEVICE FOR PREVENTING SWINE FROM ROOTING, &c.

SPECIFICATION forming part of Letters Patent No. 699,444, dated May 6, 1902.

Application filed April 20, 1900. Serial No. 13,647. (No model.)

*To all whom it may concern:*

Be it known that I, SAMUEL J. BRIGHTON, a citizen of the United States, residing at Fairfield, in the county of Jefferson and State of Iowa, have invented a new and useful Improvement in Antirooting, Stock-Marking, and Dehorning Devices, of which the following is a full, clear, and exact description.

My invention relates particularly to a cutting implement for use in operating upon live stock either to produce an excision from a swine's snout, as a preventive against rooting, to produce an excision from the ear of any animal as a means of marking the animal, or to dehorn calves with a view to preventing the growth of the horns afterward.

My object is to provide a simple implement of the nature described which is well adapted to any of the purposes enumerated.

My invention is illustrated in the accompanying drawings, in which—

Figure 1 is a view in side elevation of the improved cutting device in its preferred form, the jaws being shown open; Fig. 2, a plan view of the same; Fig. 3, a broken section taken as indicated at line 3 of Fig. 2; Fig. 4, a view of the detached knife; Fig. 5, a similar view of a slightly-modified form of knife, and Fig. 6 a broken plan view of the cutter block-head or that jaw which bears the cutter-block.

The device comprises in the preferred construction, Figs. 1 to 6, inclusive, two hand-levers A and B, connected by a pivotal bolt $a$, the lever A having a cutter-block head $A'$ and the lever B a cutter-blade head $B'$. The head $B'$ is supplied with a separately-formed detachable cutter-blade $b$, and the head $A'$ is supplied on the surface adjacent to the cutter $b$ with a copper or other soft-metal plate $a'$, against which the cutter $b$ works. The head $B'$ is bifurcated, and the head $A'$ has adjacent to the expanded portion which bears the plate $a'$ a flat pivotal portion $a^2$, which lies in a plane perpendicular to the plate $a'$ and fits between the bifurcations of the head $B'$. The cutter is flat in form and loop-shaped, being removably secured at its extremities to the outer surfaces of the bifurcated head $B'$. It has parallel attaching extremities $b'$ and forwardly-converging cutting portions $b'$, meeting in a point $b^3$. The point may be slightly rounded, as shown in Fig. 5. The knife contacts at its pointed extremity and throughout its cutting edge with the plate $a'$, thereby insuring a complete excision of flesh, cartilage, or gristle. The angle of divergence of the portions $b^2$ should be great enough to insure, when employed for antirooting purposes, against uniting of the surfaces at the sides of the V-shaped excision during healing. The sides of the expanded portion of the cutter-block head are parallel to the convergent knife portions $b^2$ and meet at an extremity $a^3$, affording a guard.

Figs. 7 and 8 illustrate modified forms of levers, cutter-block head, and cutter-head. C D represent the levers, and $C'$ $D'$ the cutter-block head and cutter-head, respectively. The cutter $d$ is removably attached at its extremities and has a cutting edge $d'$, which has a shearing action over the cutter-block $d^2$, the latter being shaped to be received by the loop of the cutter. A lug or guard $d^3$ is provided at the lower portion of the extremity of the cutter-block, which operates, as does the extremity of the head $A'$ of the preferred construction, to prevent too deep an incision.

The manner of operation is as follows: To operate upon a swine's snout in such manner as to prevent rooting, the instrument is applied with the extremity of the cutter-block $A'$ resting upon the bone of the nose above the cartilage or gristle at the extremity of the nose and the knife opposing said block located to produce an excision from the cartilage between and above the nasal passages. As is well understood, the portion of the cartilage which is employed for rooting purposes projects at substantially right angles to the direction of the snout. With the improved implement herein described any desired excision from this cartilage may be produced, varying from a shallow cut to the deepest cut permissible. The guard afforded by the extremity of the cutter-block serves to prevent an incision deep enough to strike the bone or to produce injury. The wound produced by the operation soon heals and the animal is able to eat as before. The cartilage is so divided, however, (a complete removal of a portion occurring) that the animal is effectually prevented from rooting.

To mark an animal, the instrument is applied to the ear and such excisions are produced as result in the desired marking. For instance, a V-shaped notch may be produced or two V-shaped notches may be produced, resulting in a W. By changing the angle of the instrument with relation to the edge of the ear various shaped excisions may be produced with the same cutter.

For dehorning purposes the instrument is applied to the calf's head while the calf is still quite young, and the pointed form of the knife permits the soft horn to be readily removed, such a depth of cutting being secured as to effectually prevent the horn from growing afterward.

The knife is formed separately from the head to which it is attached in all cases, thereby enabling it to be produced cheaply, and making it removable for replacement in case of breakage or for the purpose of sharpening.

What I claim as new, and desire to secure by Letters Patent, is—

1. An implement of the character described and for the purposes described, comprising two pivotally-connected hand-levers, one being provided with a cutter-block head having a flat knife-opposing surface and convergent tapering sides at its extremity, and the other having a knife-attaching head, and a separately-formed knife secured at its extremities to said last-named head and having a forwardly-projecting central web-cutting portion afforded by convergent knife-sections substantially parallel to the convergent sides of said opposed head, said cutter-block head projecting beyond the cutter, substantially as and for the purpose set forth.

2. In an implement of the character described, the combination of two pivotally-connected hand-levers, one of said levers being provided with a bifurcated head and the other with a flattened portion passing between the bifurcations of said head and having also an expanded knife-opposing head provided with a flat knife-opposing surface, said last-named head having forwardly-convergent sides, and a knife secured at its extremities to the bifurcations of said first-named head and having a forwardly-projecting cutting-web formed by forwardly-converging knife-sections, the said knife-opposing head projecting beyond said knife, substantially as and for the purpose set forth.

In testimony whereof I have signed my name to this specification in the presence of two subscribing witnesses.

SAMUEL J. BRIGHTON.

Witnesses:
 I. B. HUMPHREYS,
 J. K. BATES.